SELECTIVE SIGNALLING SYSTEM WITH RECEIVER GENERATOR
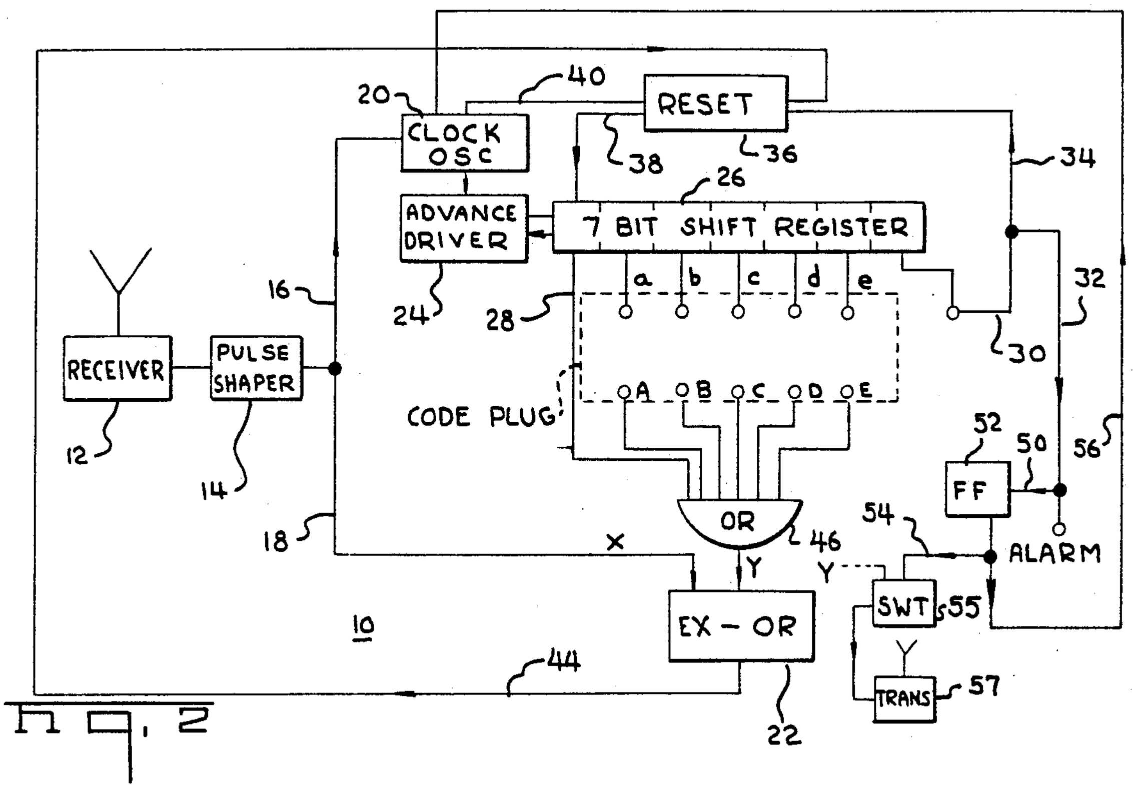
FIG. 2
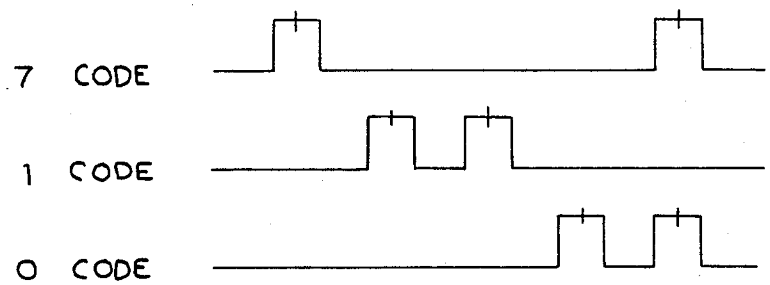
FIG. 3
| EX-OR OUTPUT | X INPUT | Y INPUT |
|---|---|---|
| 0 | 0 | 0 |
| 0 | 1 | 1 |
| 1 | 1 | 0 |
| 1 | 0 | 1 |
FIG. 5
CODE PLUG WIRING
| | | | | | |
|---|---|---|---|---|---|
| 7 CODE | aA | $\overline{bB}$ | $\overline{cC}$ | $\overline{dD}$ | eE |
| 1 CODE | $\overline{aA}$ | bB | cC | $\overline{dD}$ | $\overline{eE}$ |
| 0 CODE | $\overline{aA}$ | $\overline{bB}$ | $\overline{cC}$ | dD | eE |
FIG. 4

SELECTIVE SIGNALLING SYSTEM WITH RECEIVER GENERATOR

Filed Feb. 27, 1967 8 Sheets-Sheet 3

SELECTIVE SIGNALLING SYSTEM WITH RECEIVER GENERATOR
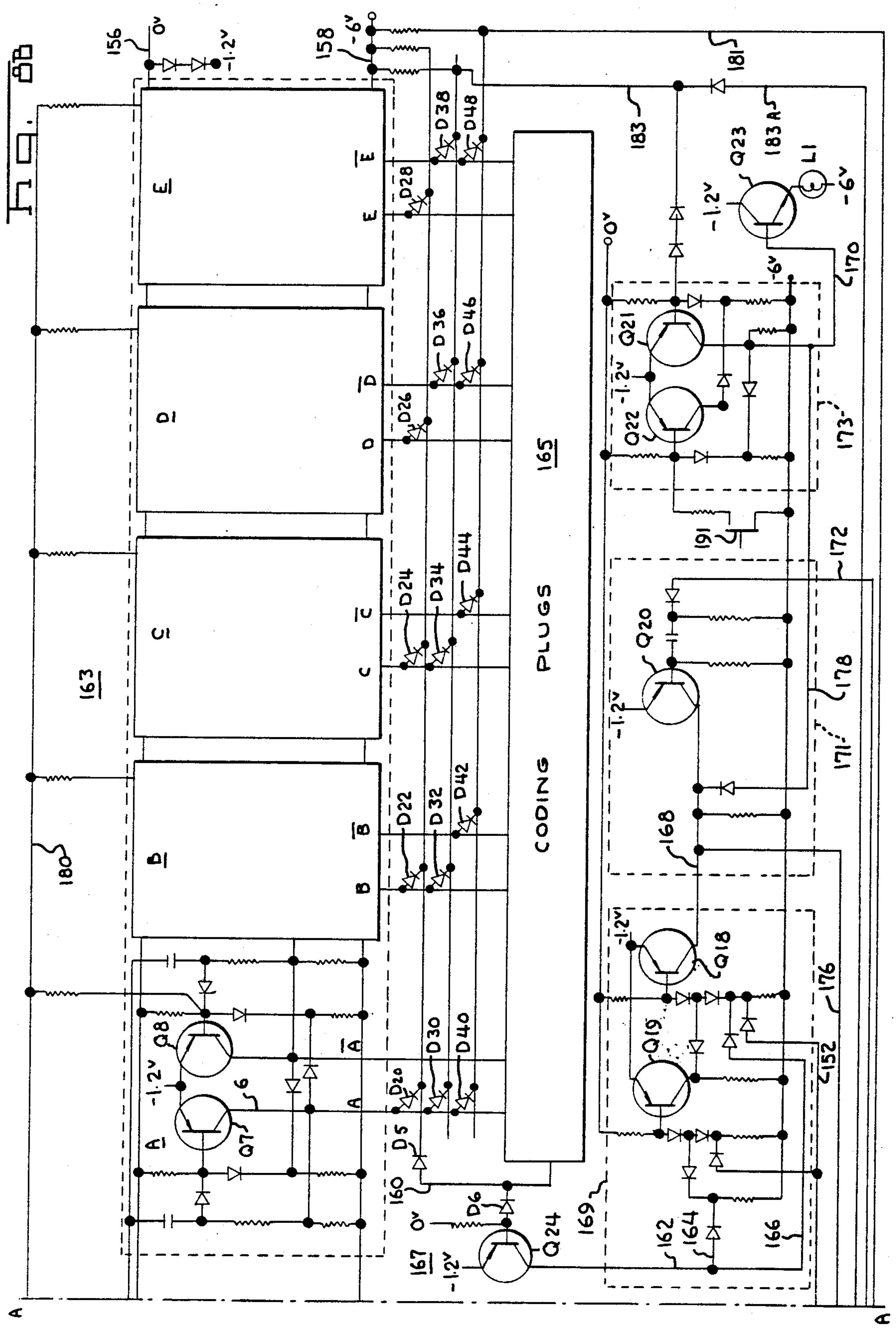

SELECTIVE SIGNALLING SYSTEM WITH RECEIVER GENERATOR

Filed Feb. 27, 1967 8 Sheets-Sheet 7

| TIME SLOT | A | $\bar{A}$ | B | $\bar{B}$ | C | $\bar{C}$ | D | $\bar{D}$ | E | $\bar{E}$ |
|---|---|---|---|---|---|---|---|---|---|---|
| REST | 0 | 1 | 0 | 1 | 0 | 1 | 0 | 1 | 0 | 1 |
| 1 | 1 | 0 | 0 | 1 | 0 | 1 | 0 | 1 | 0 | 1 |
| 2 | 0 | 1 | 1 | 0 | 0 | 1 | 0 | 1 | 0 | 1 |
| 3 | 1 | 0 | 1 | 0 | 0 | 1 | 0 | 1 | 0 | 1 |
| 4 | 0 | 1 | 0 | 1 | 1 | 0 | 0 | 1 | 0 | 1 |
| 5 | 1 | 0 | 0 | 1 | 1 | 0 | 0 | 1 | 0 | 1 |
| 6 | 0 | 1 | 1 | 0 | 1 | 0 | 0 | 1 | 0 | 1 |
| 7 | 1 | 0 | 1 | 0 | 1 | 0 | 0 | 1 | 0 | 1 |
| 8 | 0 | 1 | 0 | 1 | 0 | 1 | 1 | 0 | 0 | 1 |
| 9 | 1 | 0 | 0 | 1 | 0 | 1 | 1 | 0 | 0 | 1 |
| 10 | 0 | 1 | 1 | 0 | 0 | 1 | 1 | 0 | 0 | 1 |
| 11 | 1 | 0 | 1 | 0 | 0 | 1 | 1 | 0 | 0 | 1 |
| 12 | 0 | 1 | 0 | 1 | 1 | 0 | 1 | 0 | 0 | 1 |
| 13 | 1 | 0 | 0 | 1 | 1 | 0 | 1 | 0 | 0 | 1 |
| 14 | 0 | 1 | 1 | 0 | 1 | 0 | 1 | 0 | 0 | 1 |
| 15 | 1 | 0 | 1 | 0 | 1 | 0 | 1 | 0 | 0 | 1 |
| 16 | 0 | 1 | 0 | 1 | 0 | 1 | 0 | 1 | 1 | 0 |
| 17 | 1 | 0 | 0 | 1 | 0 | 1 | 0 | 1 | 1 | 0 |
| 18 | 0 | 1 | 1 | 0 | 0 | 1 | 0 | 1 | 1 | 0 |
| 19 | 1 | 0 | 1 | 0 | 0 | 1 | 0 | 1 | 1 | 0 |
| 20 | 0 | 1 | 0 | 1 | 1 | 0 | 0 | 1 | 1 | 0 |
| 21 | 1 | 0 | 0 | 1 | 1 | 0 | 0 | 1 | 1 | 0 |
| 22 | 0 | 1 | 1 | 0 | 1 | 0 | 0 | 1 | 1 | 0 |
| 23 | 1 | 0 | 1 | 0 | 1 | 0 | 0 | 1 | 1 | 0 |
| 24 | 0 | 1 | 0 | 1 | 0 | 1 | 1 | 0 | 1 | 0 |
| 25 | 1 | 0 | 0 | 1 | 0 | 1 | 1 | 0 | 1 | 0 |
| 26 | 0 | 1 | 1 | 0 | 0 | 1 | 1 | 0 | 1 | 0 |
| 27 | 1 | 0 | 1 | 0 | 0 | 1 | 1 | 0 | 1 | 0 |
| 28 | 0 | 1 | 0 | 1 | 1 | 0 | 1 | 0 | 1 | 0 |
| 29 | 1 | 0 | 0 | 1 | 1 | 0 | 1 | 0 | 1 | 0 |
| 30 | 0 | 1 | 1 | 0 | 1 | 0 | 1 | 0 | 1 | 0 |
| 31 | 1 | 0 | 1 | 0 | 1 | 0 | 1 | 0 | 1 | 0 |

SELECTIVE SIGNALLING SYSTEM WITH RECEIVER GENERATOR

United States Patent Office 3,513,443

Patented May 19, 1970

3,513,443
SELECTIVE SIGNALLING SYSTEM WITH RECEIVER GENERATOR

Viggo Andersen, Great Falls, Mont., assignor to AMP Incorporated, Harrisburg, Pa.

Filed Feb. 27, 1967, Ser. No. 618,670
Int. Cl. H04q 7/00
U.S. Cl. 340—164 15 Claims

ABSTRACT OF THE DISCLOSURE

The disclosure relates to a selective signalling system capable of receiving and identifying an address at a receiver station wherein the code length is variable, the system being made capable of receiving a new code message immediately upon sensing a non comparison during the comparison operation. The comparison takes place on a bit by bit basis by comparing the transmitted address with a receiver generated address and comparing same via an exclusive OR circuit. As long as comparison takes place, the bit by bit sensing takes place. A single non comparison immediately causes reset of the comparison apparatus.

This invention relates to a selective signalling system for communication between two or more remote stations, and particularly, to a system wherein a given transmitted station calling code is locally generated at a given receiver and synchronously compared with a received calling signal to provide an indication of the receipt of a proper calling code signal. Since the invention system contemplates generation of a calling code at the receiver, the same mechanism is capable of generating the calling code for transmission back to the calling station to acknowledge receipt of call.

Most selective signalling systems operate on either a time or frequency basis. Those which operate on a time basis are arranged to respond to a series of bits formed into some code format with bits being represented by the presence or absence of pulses. Those systems which operate on a frequency basis are arranged to respond to a plurality of distinct frequencies, one for each bit. Time basis systems use a sequence detector which detects the sequence of bits of a calling code for a given station and rejects all other sequences, some of which relate to other called stations. Frequency basis systems may utilize a sequence detector or may operate in a parallel fashion to form the code format from the several frequencies of the transmitted signal simultaneously. Hybrids of time and frequency approaches are also employed wherein different frequencies are sent in series to be detected by a sequence detector after first being filtered and formed into pulses.

One of the problems that afflicts both types of systems is response to false or spurious calls or to calls having a close similarity to a proper calling code. False operation may result from the accidental generation of code bits from sources other than those of the particular system or from portions of different calling codes which together form the code of a given station. The basic problem is that if a given receiver is set up to respond to a given pulse voltage level or distinct frequency, it will begin to respond notwithstanding the fact that the signal may be erroneous. When this happens the particular receiver will then be disabled from accepting a proper code signal until it has been reset. It will also be enabled to accept that part of its calling code which would follow the first bit of its sequence even though that fraction of the code forms part of some other called station code or was accidentally generated by non-system equipment.

A further problem with existing selective signalling systems is that of complexity. Most systems which utilize some kind of detector apparatus require a number of stages exactly equal to the number of bits in a code. Apparatus of this type calls for an arrangement of stages which does not lend itself to an expansion to accommodate larger numbers of stations in a given system. An example of the latter is found in decoding tree type detectors wherein to add stations to the system the tree must be expanded by the addition of numbers of stages to form the branches leading to the one position which will provide a detect output signal for the station.

It is an object of the invention to overcome a number of the foregoing shortcomings through the provision of a relatively simple time digital code selective signalling system and method which may be implemented with a variety of bi-stable elements such as semi-conductors, magnetic cores, relays or combinations of different types of bi-stable elements.

It is also an object of the invention to provide a novel method of generating codes and providing a comparison to effect the detection of selected code sequences.

It is another object of the invention to provide a selective signalling system including a receiver which generates the calling code locally or internally for detection and also for use in acknowledging receipt of call by generating the code which is unique to the call station.

Still another object of the invention is to provide a selective signalling system receiver which discriminates against calls which may contain a proper code sequence along with other bits making the call of a different and therefore improper code length for such receiver.

A further object of the invention is to provide a selective signalling system which may be readily expanded at any time to accept more complicated code sequences with the addition of a minimum number of additional components and without influencing the operation of existing equipment other than that used for longer or more complicated codes.

It is still a further object of the invention to provide a selective signalling system which may be utilized with less stages for bit generation and/or reception than there are bits in the code sequence employed with the system.

It is yet another object of the invention to provide a selective signalling system capable of operating from binary devices in a binary mode and, simultaneously, producing a related decimal output for comparison purposes and for generation of an acknowledgement code.

The foregoing problems are overcome and the foregoing objectives are attained by the invention system and method by locally generating a calling code from a standard counter generated code, comparing such code with a received calling code on a bit-by-bit basis and then generating control signals based on compare or noncompare conditions. The calling station equipment may be any standard apparatus capable of generating a code sequence which is timed to provide equal bit spacing. The invention contemplates several specialized receiver embodiments which contain an oscillator clocked to the same period of bit generation as that of the calling code and calling station. The invention contemplates the use of a standard bit pattern generating counter or shift register in conjunction with an encoding matrix for generating the calling code in proper sequence and time relation on a bit-by-bit basis with respect to the calling code. The receiver apparatus includes a simple Exclusive-OR logic stage which compares a received calling code and the locally generated code on a bit-by-bit basis to produce substantially no output as long as a "like" comparison is made, with an output being generated when an "unlike" comparison occurs. This latter output operates to block further operation of the receiver equipment and to reset receiver apparatus for the next event. The receiver oscillator is caused to continue to run until a single bit is driven out of the device or a given bit pattern occurs and is detected to provide an alarm or receipt signal, to provide a reset signal and, in one embodiment, to provide a recycling of the device to generate an acknowledgement signal identical to the calling code for the station. The invention further contemplates a use of code plugs which may be inserted in an encoding matrix between the bit generating register or counter and the Exclusive-OR logic device to change output response to a generated code to thereby permit substantially the same apparatus to be used for each of a large number of receivers.

In the drawings:

FIG. 2 is a schematic diagram showng a simplified receiver circuit forming one embodiment of the invention;

FIG. 3 is a time-sequence diagram showing several simple code patterns to explain the circuit of FIG. 2;

FIG. 4 is a schedule of matrix connections for causing the circuit of FIG. 2 to respond to the several different codes of FIG. 3;

FIG. 5 is a truth table showing the combinations of inputs to the Exclusive-OR and the circuit of FIG. 2 to produce circuit operation;

Figure 6:
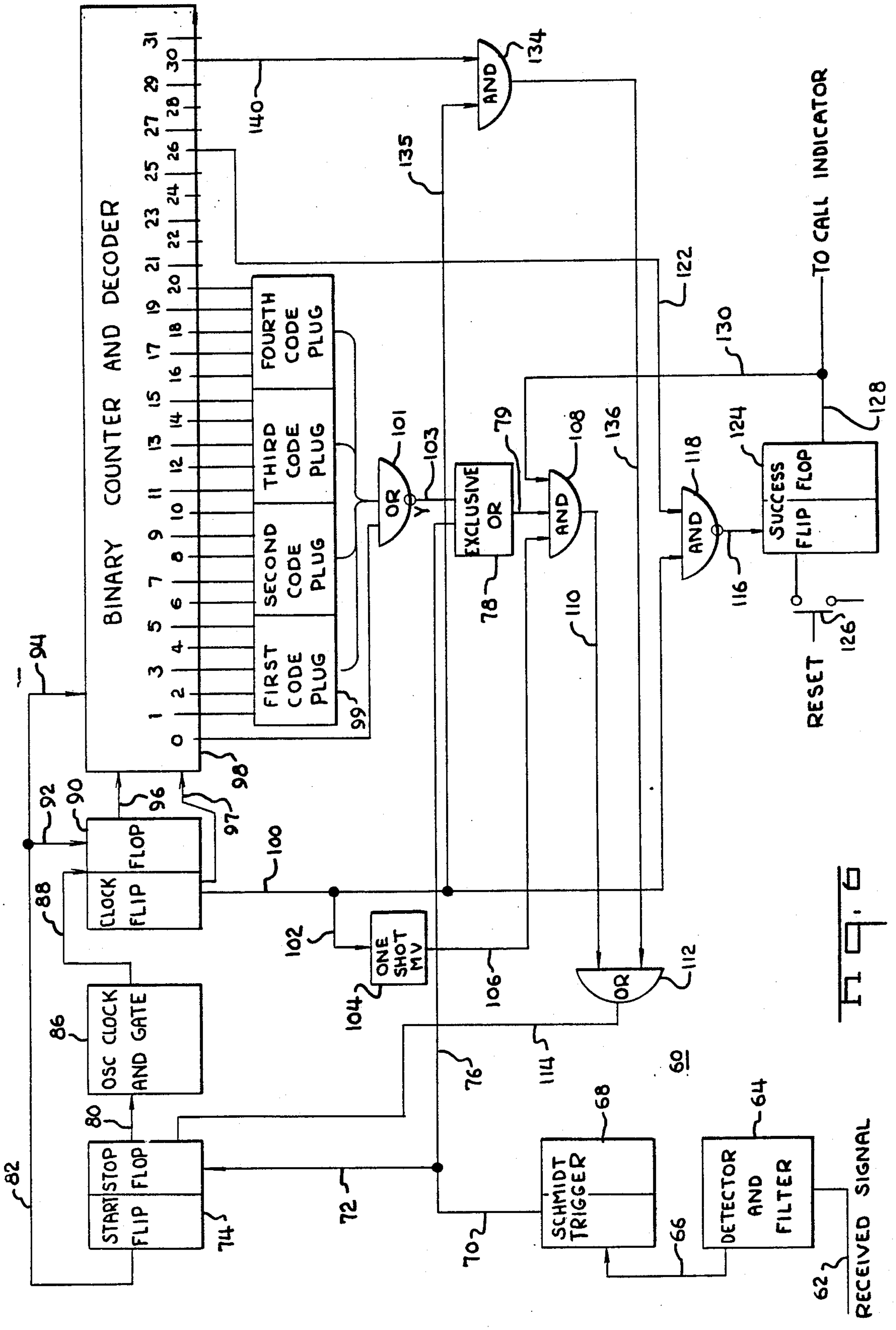
FIG. 6 is a block diagram for a receiver circuit of the invention system expanded relative to the circuit of FIG. 2, and capable of use with different types of local code generation components.
Figure 8A:
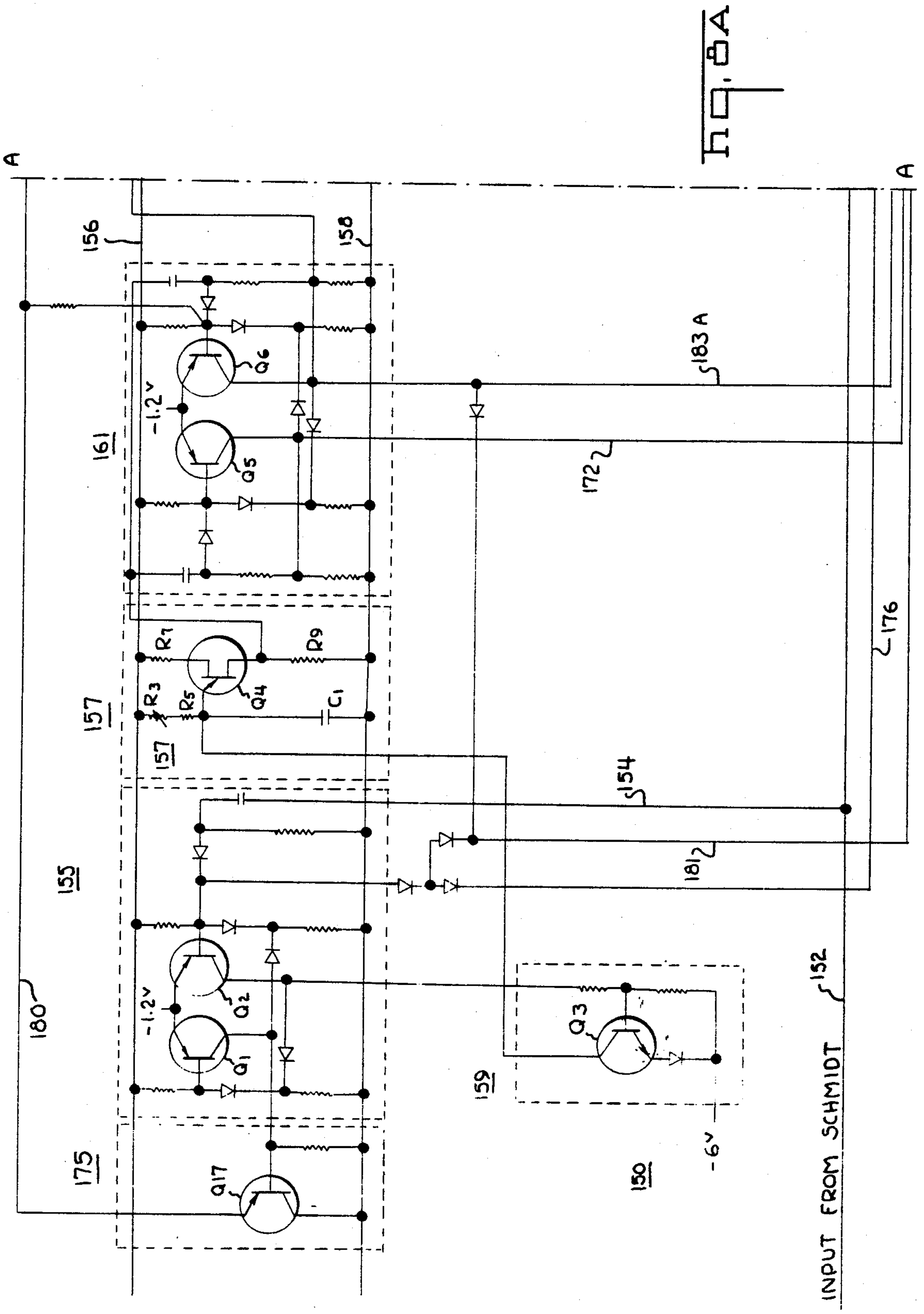
Figure 9:
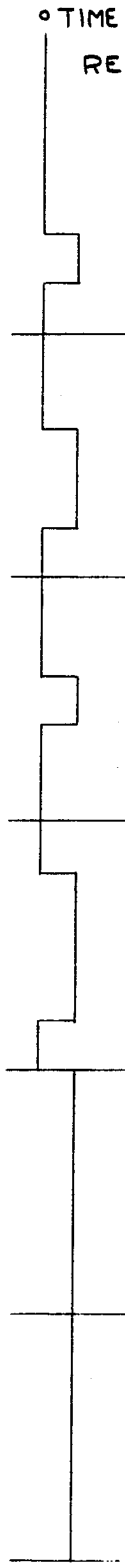
Figure 10:
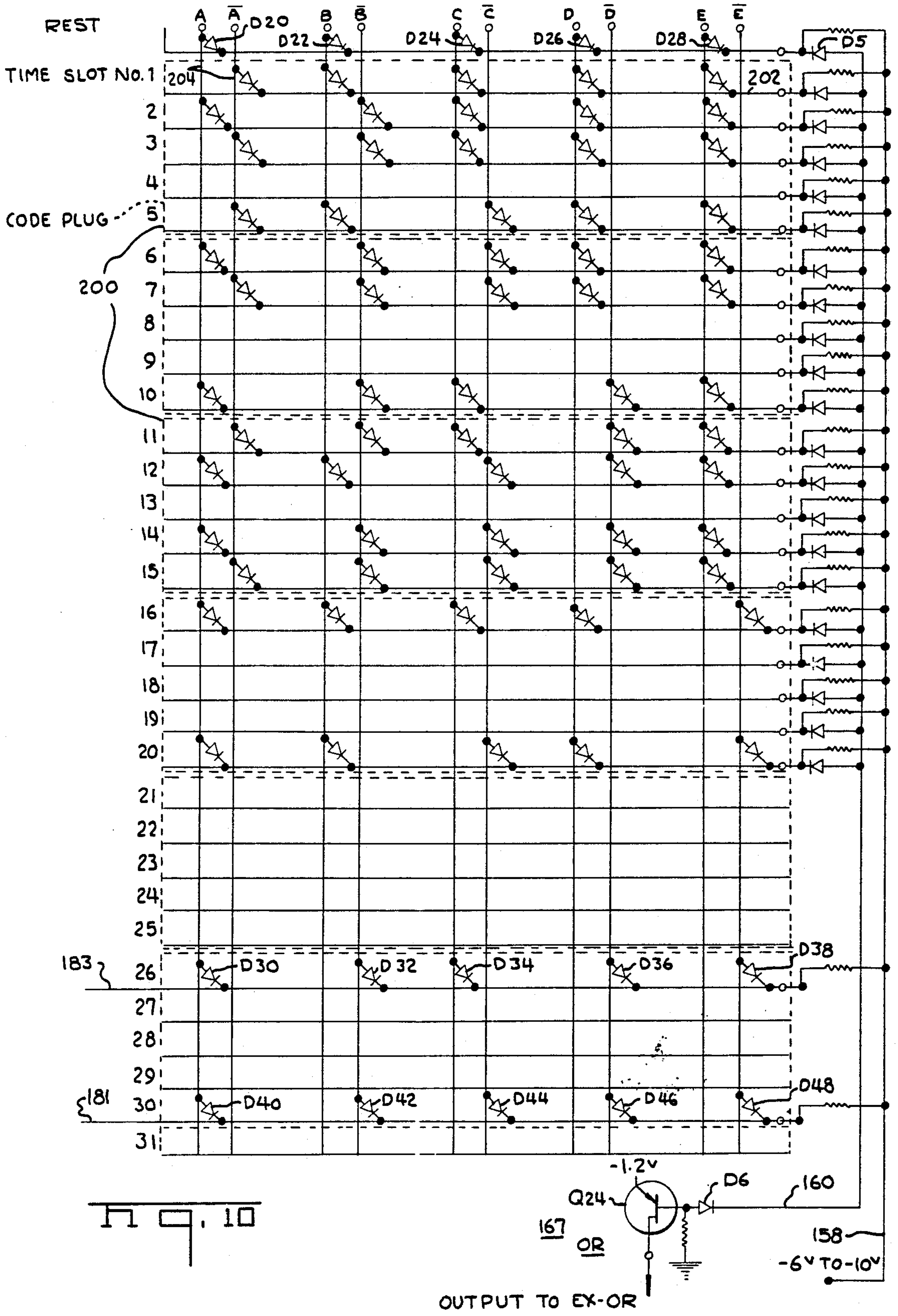

FIGS. 8A and 8B form a schematic diagram showing in detail a circuit and components for a receiver like that shown in FIG. 6;

FIG. 9 is a schedule showing binary patterns generated by a binary counter which forms one embodiment of the receiver circuit; and FIG. 10 is a schematic diagram showing diode placement and coding plug arrangement for generating a calling code from the binary patterns of FIG. 9.

The master encoder and transmission equipment referred to may be of any suitable type capable of generating and transmitting codes having the simple waveform characteristics to be described hereinafter. A number of equipments capable of providing clocked waveforms are available. A preferred master station encoder for use in the system calling station of this application is detailed in U.S. application S.N. 565,624, filed July 15, 1966 in the name of E. C. Dowling, et al. In the following description of the system only receiver equipment embodiments will be detailed, the calling station code being considered as being generated by suitable means arranged in the system as depicted in FIG. 1.

Figure 1:
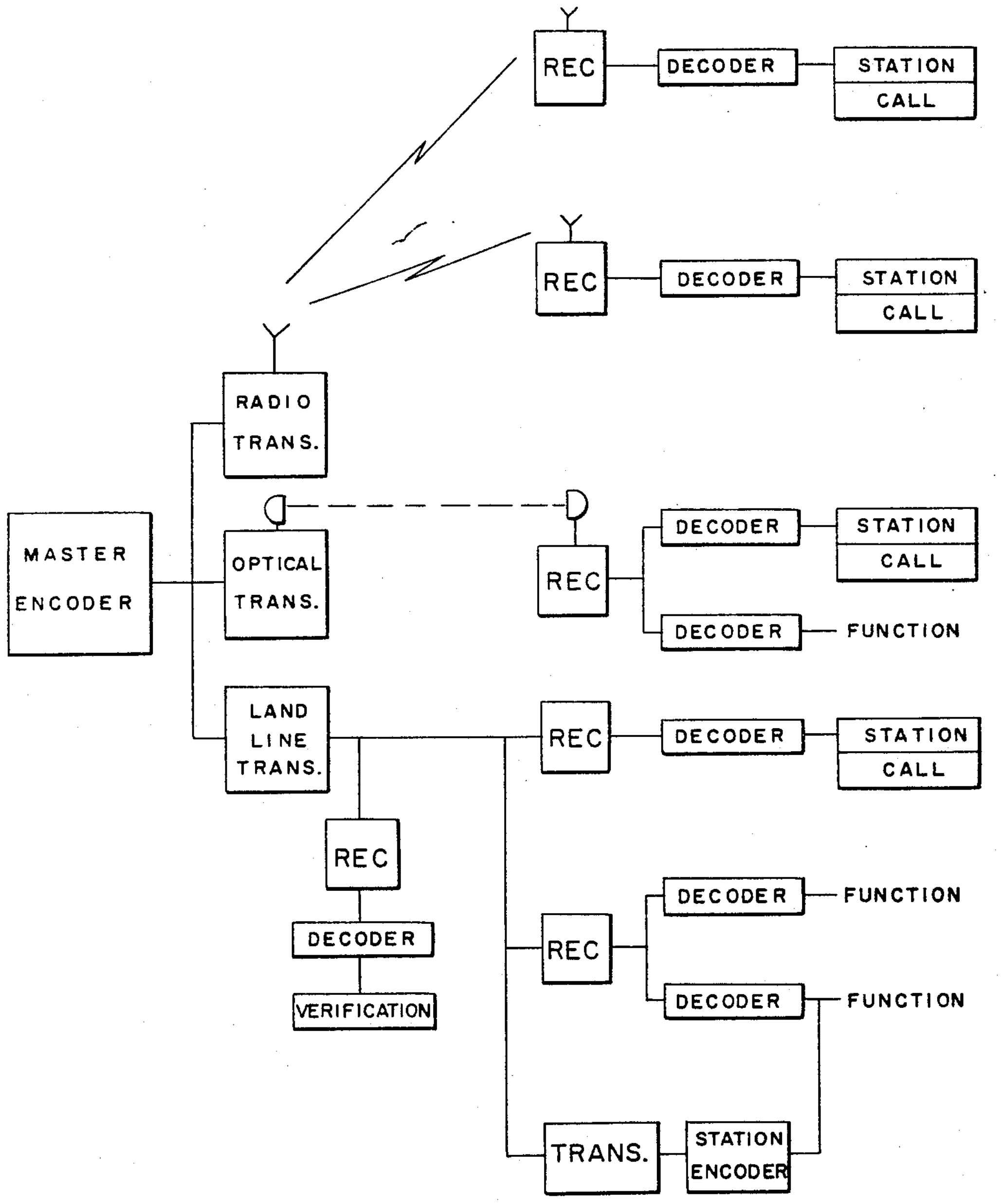
FIG. 1 is a block diagram showing various system arrangements of master and receiver stations relative to typical transmission modes and typical system functions.

Turning now to FIG. 1, there is shown a selective signalling system including a variety of transmitter and receiver equipments general to the type of application contemplated for the present invention. There is included a master encoder capable of generating station calling or equipment function codes which are then transmitted by various means such as a radio transmitter, an optical transmitter or a land line transmitter. The master encoder may be operated by manual insertion of information in digital, decimal or binary form through dial or push-button devices or may be machine-fed from tape, punch cards or other storage media. The encoded intelligence is then preferably translated into a time digital code waveform, comprised of distinctive groups of pulses positioned in time slots of constant duration to define different characters in the code which is then transmitted directly or, in many instances, superimposed upon a suitable carrier compatible with the type of transmission contemplated. For example, with respect to the radio transmitter, the waveform is superimposed upon a carrier in a selected AM or FM frequency band assigned to the particular type of communication. This may be done directly or by converting the initially encoded waveform into a single frequency tone or absence of tone, or into two tones, one for on and one for off pulse conditions. In the case of optical transmission this waveform is employed to modulate a transducer capable of biasing an optical source such as a laser, or like device, into on-off conditions to provide pulse modulation for that type of transmission. With respect to land line transmission, the calling code may, in certain instances, be sent directly as an on-off voltage level or, as is more frequently the case, sent as a distinct tone or tones in some frequency bandwidth so limited as not to interfere with voice communication. In closed circuit applications, such as in factories or as links between pumping stations on gas or oil lines, the calling signal may be superimposed upon existing communication lines or upon power lines by well-known techniques.

As will be developed more fully hereinafter, the code structure and associated equipment employed by the invention lends itself to use with a relatively large number of called stations to control functions. In FIG. 1, relative to radio transmission, a pair of receivers represent a large number of possible receiver stations. Each receiver will where necessary include equipment to demodulate the transmitted signal and/or detect the tone or tones used to represent the encoded on-off waveform. With each receiver station there is provided a decoder which has an output to some station call device such as an audible or visual indicator. Upon transmission of each calling signal each receiver associated with the system is actuated to attempt to respond. Only the receiver decoder set up for the particular code called will, however, respond to produce an output and an indication that the station is being called. All other stations in accordance with the invention will not respond.

The transmission of an optical calling signal is in a similar fashion received by a receiver and its decoder is operated to initiate a station call device. In the case of the optical receiver (and applicable to all of the various modes of transmission of FIG. 1) there is shown a pair of decoders, which decode the calling signal in parallel. One decoder has its output connected to initiate some control function. A representative application calling for this arrangement is one where the upper decoder operates from one calling code to signal the associated station that is being called for a normal or working purpose and the lower decoder is set up to receive a special code to initiate some alarm device to indicate the occurrence of an emergency, such as anticipated equipment failure or a change of mode of transmission.

The receivers associated with the land line transmission mode are shown to be connected in parallel to represent a variety of decoder arrangements for station calls, control functions and verification of received call. The lower receiver is set up to supply parallel decoders, one of which has its output connected to a station encoder and transmitter to verify the successful detection of the calling code by transmitting a unique code back to a receiver and decoder at the master station.

In conjunction with the invention system, a particular type of code structure and signal waveform is employed. A detailed explanation of its advantage to both encoding and decoding equipment as well as to transmission equipment will be made apparent in the detailed description to follow. Briefly, the code structure contemplates a translation from decimal members into a type of binary representation in the encoder, a translation into a time digital waveform between the encoder and the transmitter and a given receiver and a translation from the time digital waveform into another binary code for detection at the receiver decoder. Where necessary the time digital waveform is translated from a D.C. level into a tone or tones before being supplied to transmitting equipment and such tone or tones are translated back into the on-off waveform before being supplied to the detector part of a receiver. The various code forms employed are made to be optimum for the type of equipment used in each phase of system operation. In the description to follow the terms "set" and "clear" represent the binary symbols employed in encoding. It should be observed that the invention is not limited by the type of binary calling code used. Although a particular calling code is used in the following description, any other binary calling code having the common characteristics of constant character length and constant parity may be used with the invention.

GENERAL DESCRIPTION

Referring now to FIGS. 2–4 a generalized embodiment of a receiver station will now be described. The receiver station circuit shown as 10 includes a receiver 12 which as heretofore mentioned may be any suitable receiver adapted to respond to the type of signal transmitted and to produce an output to the decoder portion of the circuit in the form of pulses corresponding to the pulses generated by the master encoder of the calling station. The output from receiver 12 is supplied to a pulse shaper 14 which has the function of reforming each received pulse into a pulse having a sharp rise and fall time and defined amplitude level. A preferred component for 14 is a Schmitt trigger, a circuit well known in the art. The output from the 14 is supplied to two leads 16 and 18 which connect the incoming code to a code generating portion of the circuit at the top right of FIG. 2 and to a comparison portion of the circuit, therebelow. Lead 16 is connected to a clock oscillator 20 which may be any standard pulse producing oscillator set to run at a constant rate related to the clock rate of the received code. The oscillator output is connected to drive an advance driver 24 which will cause such driver to provide properly timed drive pulses to a register 26 comprised of a number of bi-stable stages. The output from 24 is made to step the register to provide outputs in phase with the received code from leads connected in parallel to the stages. The oscillator 20 is of a type capable of responding to a first control signal to come on and oscillate continuously until cut off by a further control signal. The lead 16 serves as a start lead and a lead 40 serves as a stop lead. The driver 24 may be any standard driver capable of producing alternate pulses on alternate leads. Drivers having these characteristics are well known and are usually termed odd-even drivers which produce pulses on separate leads alternately as long as the driver is energized.

In accordance with the invention once oscillator 20 is started it will energize 24 to run until some separately developed signal stops the oscillator. The stages of register 26 are connected for serial transfer of a binary one along the register in response to advance pulses from 24. In this general description the register includes seven stages which each form a time related bit position. Each stage may be a flip-flop or magnetic core capable of being driven into one or zero binary states. In this embodiment five of the stages have parallel outputs shown as *a–e*. The five stages are serially placed in the second, third, fourth, fifth and sixth stage positions. The first stage and first bit position has an output 28 connected to an OR gate 46 and an input via a lead 38 connected to a reset driver 36. The last or seventh stage has its output connected to a lead 30 which goes to an alarm lead 32 and to a lead 34 connected to the reset driver 36. The reset driver may be any signal generating device which is capable of producing a signal output in response to a signal input. The reset driver 36 has two parallel outputs including the lead 40 which provides the STOP control for 20 and lead 38 which is linked to each of the stages in 26 in a manner to set or inject a binary one in the first stage or bit position and clear or inject a binary zero in all of the remaining stages or bit positions. A second input to 36 is provided via a lead 44 connected to a standard Exclusive-OR logic device shown as 22. An output from 22 operates to energize 36 to cause signals to be produced on leads 38 and 40 to reset the register and at the same time stop clock 20.

Each of the lettered outputs, *a–e*, are in accordance with the invention, connnected to terminals adjacent or proximate a further and like array of terminals, lettered A–E. This arangement of terminals may be on a printed circuit card with fixed terminal posts for each of the lettered terminals *a–e* and A–E. It is contemplated that coding plugs having appropriate symbols thereon may be utilized to effect distinct interconnections between the terminals *a–e* and A–E. This may be done by providing female contact terminals fixed in an insulating body of the code plug and interconnected in desired patterns by printed circuit paths between the plug terminals. Mating male terminal pins would then be connected to the circuit leads *a–e* and A–E. When a plug is placed in position certain of the terminals *a–e* will then be connected to the terminals A–E. In this general embodiment then, code plug logic is accomplished by the presence or absence of a bus between similarly lettered terminals; i.e., between *a* and A, *b* and B, etc. If there is a bus between the terminals *a* and A an output signal will be developed to the lead associated with A. If there is no bus then no output signal will be developed.

All of the terminals A–E are connected in parallel to the OR gate 46 which may be any standard device capable of providing an output responsive to any input from *a* or *b* or *c*, etc. The output from 46 serves as an input to 22 labeled Y. The input to 22 from the 14 and from the receiver is labeled X. FIG. 5 shows a truth table indicating the output from 22 responsive to combinations of inputs X and Y.

FIG. 3 shows a time-sequence diagram for three representative calling codes. The calling code clock rate is indicated by equally spaced vertical lines which form spaced time slots and the code composition is indicated by the position of pulses in these time slots positions. The code format shown in FIG. 3 is for a two-of-five code; exemplary characters for 7, 1 and 0 being shown. As depicted the 7 character is formed by a pulse in the first and last time slots with no pulse in the second, third or fourth time slots. The 1 character is formed by pulses only in the second and third time slots and the zero code is formed by pulses only in the fourth and fifth time slots.

FIG. 4 shows a code plug busing corresponding to the three codes shown in FIG. 3. The presence of a bus is indicated by the letters of the terminals, such as *a*A. For a 7 character there is a bus connecting the terminals *a*A and *e*E with no bus between the remaining lettered terminals. The character busing for 1 and 0 characters is similarly represented.

Turning now to a description of the operation of 10 we start with a reset condition with the first stage set and all other stages cleared. If we assume now that a calling code is transmitted which contains a tag or start pulse, not shown in FIG. 3, but preceding the five time slots for a character 7 the circuit 10 operates as follows. The receiver 12 receives the code to produce pulses in sequence to 14 which shapes these pulses as previously mentioned. The tag or start pulse operates via 16 to start oscillator 20. At the same time the tag pulse drives 22 via 18 as an X input, but since, at that time, the first stage is set, there will be a 1 or Y input from the first stage via 28 and 46 to the Exclusive-OR. In accordance with the operation shown as FIG. 4, 22 will produce no output.

When oscillator 20 is started it causes 24 to drive the register 26. In accordance with the invention the 1 bit placed in the first bit position prior to receipt of any call will be driven to advance along the register producing sequential outputs on the terminals *a–e* at the advance drive rate and therefore at the clock rate of the calling code. In accordance with the transmitted and received code for a 7 character the time slot following tag contains a pulse which is supplied to 18 and therefore to 22 to represent an X input. At this time the 1 bit in the first stage of 26 will have been transferred to the second bit position to produce an output on *a*. In accordance with the code plug wiring shown in FIG. 4 there is a bus from *a* to A and therefore there is an input to 46 and a Y input to 22. Since there is a simultaneous input of X and Y there will be no output from 22 in accordance with the truth table of FIG. 5. The next time slot for the 7 character contains no pulse and therefore there will be no X input at this time to 22. The 1 bit in the register will produce an output on *b* but since there is no connection from *b* to B there will be no input to 46 and no Y input and therefore in accordance with the truth table there will be no output from 22. As will be seen from a comparison of FIGS. 3, 4 and 5 the third and fourth time slots do not contain pulses and third and fourth stage terminal pairs do not contain buses and therefore there will be no output from 22. In the fifth time slot there is a pulse for the 7 character and there is a bus across terminals *e*–E to therefore produce an input to 46 corresponding with the input from X for the calling code. Accordingly, there will be no output from 22 at this time and the oscillator will continue to run to cause the advance driver to drive 26.

The 1 bit transferred from the sixth stage associated with *e* to the last stage produces an output on lead 30 to impulse lead 32 initiating an alarm to indicate a successful detection of the calling code and thus indicate that the receiver station has been called. Simultaneously, the output on 30 is supplied to 36 via lead 34 to cause the register to be reset to the initial position with a 1 bit in the first stage and with the remaining stages cleared. A pulse from 36 on lead 40 will at this time cut off oscillator 20.

It should be apparent from FIGS. 3, 4 and 5 how the register operates when furnished with code plugs programmed for 1 or 0 characters to provide an indication in response to 1 or 0 calling codes.

Assume now that the circuit 10 is programmed as shown in FIG. 4 by the use of a 7 character code plug and that the calling code is that for the 1 code shown in FIG. 3. As before, a tag pulse, not shown, will start oscillator 20 causing an advance of the 1 bit in the first stage of 26 under drive from 24. In the first time slot in accordance with the 1 code there is no pulse. There is, however, a bus from *a* to A due to the use of the code plug for the 7 character. There will therefore be an input to 46 and to 22, a Y input. There will at this time be no X input from 18 since there is no pulse in the first time slot for the 1 calling code. As indicated in FIG. 4, X and Y inputs of 1 and 0 will produce an output from 22. This output is fed by lead 44 to the reset driver 36 which, in turn, operates to stop 20 and at the same time via lead 38 operates to set register 26 to its initial condition. As will be apparent the alarm will not have been initiated. The foregoing represents a very generalized teaching showing certain of the concepts of the invention method and system.

Also depicted in FIG. 2 are circuit components which may be utilized with transmitted equipment to furnish an acknowledgement of call. Connected to the output lead 32 from the last stage of 26 is a lead 50 connected to a flip-flop 52 which serves to provide on lead 56 a pulse to start the oscillator 20 in the same manner that it started by a tag pulse on lead 16. Once the oscillator 20 is started it will continue to run as heretofore mentioned causing an advance of the bit in the first stage along the register producing outputs on the terminals *a*–*e*. A lead 54 is connected to a switch 55 which, in response to a signal from 52, disconnects the Y lead from 46 to 22 and connects it to a transmitter 57 capable of transmitting back to the calling station. Switch 55 also breaks line 44 to preclude reset. The circuit 10 will then produce its calling code as an input to transmitter 57 which will transmit the calling code back to the master station to acknowledge receipt of the call. When the 1 bit arrives in the last stage of 26 it will again impulse lead 30 and leads 32 and 34 to reset the system. The flip-flop 52 will be driven to an opposite condition to operate 55 and restore the connection of the lead from 46 to 22 and from 22 to 44, and break the connection to the transmitter 57 associated with the system. In this way, a very simple addition to the circuit provides for an automatic acknowledgement of the exact calling code generated by the same structure that was utilized in detecting the calling code. The flip-flop may be any standard device capable of producing a continuous output responsive to a pulse input and then, responsive to a further pulse input being set to an alternative condition. Such a device is commonly known as a commutating flip-flop. The switch may be any suitable solid state or electromechanical switch capable of being driven to make and break circuit paths in response to an input.

With respect to the generalized embodiments heretofore given it is contemplated that the bi-stable state devices mentioned may be relays or solid state flip-flops comprised of transistors or the like, or may be magnetic cores. If magnetic cores are utilized, a preferred readout technique to provide a continuous output which a given stage is set may be in accordance with the teachings in U.S. application Ser. No. 249,466, filed Jan. 4, 1963, in the name of J. C. Mallison et al.

DETAILED DESCRIPTION

Figure 7:
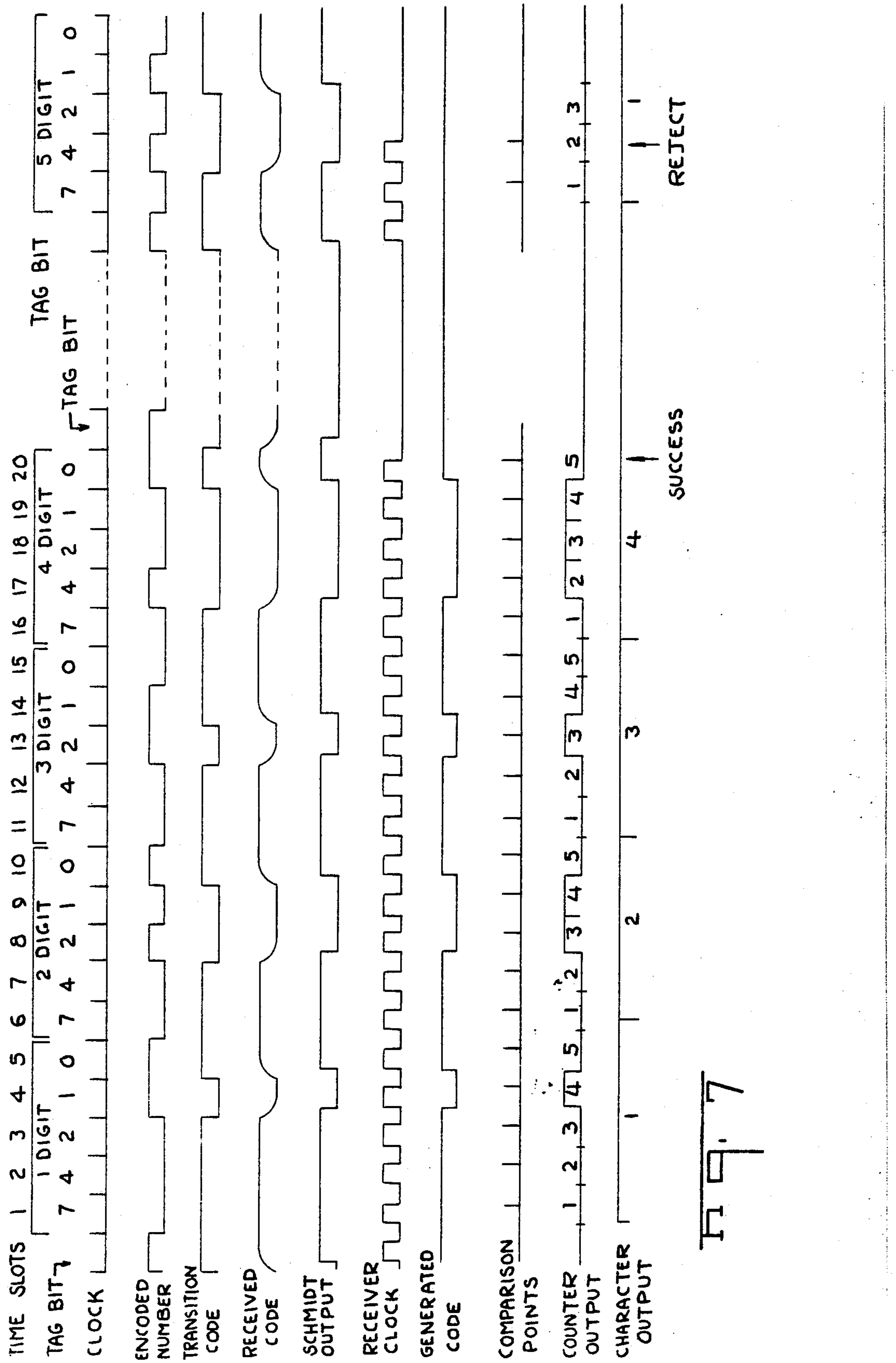
FIG. 7 is a time-sequence diagram showing voltage waveform representative of typical codes and the resulting response by elements in the circuit of FIG. 6.

Turning to an alternative and expanded embodiment of the system of the invention, FIG. 6 shows a receiver station circuit 60 capable of accounting four calling numbers and thus capable of use in a system having as many as 9,999 receiver stations. FIG. 7 shows a time-sequence diagram for a typical four character code and, in particular, voltage levels occurring at various components in the circuit 60 during operation. The completed diagram in FIG. 7 represents circuit operation for a programming of the four characters 1–2–3–4. The partial diagram represents circuit operation responsive to the receipt of a first character 5.

Overall operation of the circuit 60 is similar to that heretofore given in the description relating to the circuit organization and arrangement of circuit 10.

Turning now to the operation of circuit 60, it is assumed that a four character code has been transmitted and is being received from suitable receiver apparatus via a lead shown as 62 to the left of the circuit. It is further assumed that the receiver circuit 60 is programmed for the code 1–2–3–4, as represented in FIG. 7. The time-sequence diagram in FIG. 7 is arranged to show the first bit in time to the left and is therefore to be read from left to right. The time slots for each of the bits of the code are shown at the top of FIG. 7. Immediately under the top line there is shown a two-of-five code format for associated time slots. Immediately under the two-of-five code format there is a waveform which represents the encoded number 1–2–3–4 expressed in pure two-of-five. The pulse to the left represents a start tag bit which is transmitted prior to the four character bits and the pulse to the right represents a stop tag bit which is transmitted following the four character bits. The previously mentioned application to Dowling et al. explains a preferred technique for developing not only the character bits in proper sequence, but also for automatically injecting the tag bits. Beneath the pure two-of-five code representation is what may be termed a transition code waveform which is developed in the manner referred to in the above-mentioned application to Dowling et al. by gating a voltage supply on or off each time a 1 bit occurs in the sequence of code bits generated to define the encoded calling code. As heretofore mentioned, the transition code may be sent directly or may be caused to modulate some carrier for transmission. The received code is as appears beneath the transition code. The degradation to the waveform that is apparent is typical for radio transmission.

The received code waveform is restored at the receiver circuit 60 by a Schmitt trigger 68 after being detected and filtered by a standard filter 64 capable of removing unwanted carrier or other signal components from the incoming signal. The filter 64 is particularly useful when the calling signal is within a distinct frequency band and other non-code signal frequencies may be expected in the background.

Beneath the received signal waveform in FIG. 7 is the waveform output from 68 which is supplied to the oscillator and Exclusive-OR components of the circuit via leads 70, 72 and 76. Beneath the Schmitt trigger output, waveform in FIG. 7, is the receiver clock waveform. This clock is generated by the circuit 60 of FIG. 6 in the following manner. The output from 68 supplies lead 70 and lead 72 to drive a flip-flop 74 from a condition wherein the right hand portion is blocked to a conduction connected to an oscillator 86. The oscillator 86 is then turned on to drive the clock flip-flop 90 which in turn produces the waveform shown. As can be seen, this waveform is comprised of a sequence of pulses having the rise time thereof nearly coincident with the time slot boundaries established by the transmitting clock. The fall time of each of the pulses is nearly coincident with a period halfway between any one of the time slots for the two-of-five code. The slight delay evidenced in FIG. 7 may be expected due to component response and the degeneration of the received code and is shown to indicate how the circuit accommodates timing variations. The oscillator in 86 may be of any standard type capable of responding to an input signal to produce pulses of the type shown in FIG. 7 at a frequency related and controlled relative to the transmitting clock. In an actual system the time slots were approximately 22 milliseconds in duration with the oscillator pulses being approximately 11 milliseconds in duration.

The pulses shown in FIG. 7 as the receiver clock are produced as an output from 90 under drive from 86 on a lead 88 to alternately energize a pair of output leads shown as 96 and 97. These pulses form odd and even advance drive pulses for a shift register or counter 98.

Connected to the left hand half of 74 is a further lead 82 which connects 74 to the clock flip-flop 90 and to register 98. The lead 82 serves as a reset line and is operable to cause the clock flip-flop 92 to be reset to a predetermined condition and to cause register 98 to be reset to a condition so that the first stage thereof shown as 0 contains a binary one and the remaining stages are cleared to contain binary zeros. The oscillator 86 is also cut off responsive to 74 being driven to the condition causing reset by a separately developed control signal input on a lead 114.

Continuing on with the description of the circuit 60 and referring back to the incoming code as depicted in FIG. 7, we find that the first portion of the signal produced on lead 70 and on lead 72 is a transition which may be considered as a voltage level more positive than prior to the tag bit time slot. This transition operates to drive 74 to the start condition so that 90 will start to drive register 98. The register 98 in this embodiment is made to include a number of bi-stable stages greater than the number of bits in the calling code. The particular use of 31 stages is included for explaining an alternative embodiment hereinafter to follow which uses five stages to provide 31 distinct binary code patterns. For the moment, register 98 may be considered as a standard serially connected shift register made up of bi-stable state devices, such as transistorized flip-flop, magnetic cores, relays, or the like. Each of the register stages, including the stages numbered 0 through 20 have outputs connected in parallel which lead to an OR gate shown as 101. The output from the first or 0 stage is connected directly to 101 and the outputs from the stages numbered 1 through 20 are connected through coding plugs 99 for groups of five outputs. The interconnections achieved through the coding plugs may be formed by the presence or absence of conductive buses and the character coding plugs are connected in the manner heretofore utilized in the generalized teaching of the invention relative to circuit 10.

As 98 is driven from its initial condition by the presence of advance pulses on leads 96 and 97, the binary 1 stored in the first or 0 stage will be progressively advanced along the register to produce sequential outputs on the leads numbered 1 through 20. By a selective connection of paths from the numbered outputs, signals may be produced into the OR gate 101 to generate a code. For the code 1–2–3–4 there would be connections in the first code plug from the register outputs to the coding plugs and to 101 for the stages numbered 1, 2, 3 and 5 and no connections for the stage numbered 4. In accordance with the invention in one embodiment the outputs from the stages are presented when the 1 bit enters the stage and continue as long as the bit is in the stage. This is easily accomplished if the stages are comprised of flip-flops by merely using each half of the flip-flop as a numbered output and providing an enabling driver from one flip-flop to the next in series. It is easily accomplished with multiaperture magnetic cores by providing nondestructive readout from each core through RF techniques.

Following the diagram of FIG. 7 it will be apparent that as the 1 bit is transferred along the stages outputs will be produced on the leads connected to the coding plugs. As can be seen from FIG. 6, there is a direct connection from the 0 or first stage to the OR gate and therefore as long as there is a 1 in the 0 stage there will be an output to 101. When the bit is transferred into the stage numbered 1 there will again be an output to 101. When the bit is transferred into the second and third positions there will be an output since there are connections. The generated waveform shown in FIG. 7 appears to be continuous and for all practical purposes is so, even though there is a slight break in the waveform during the time when a 1 bit is being transferred from one stage to the next. Since there is no connection at stage 4 the input to 101 would change as depicted in FIG. 7, when the 1 bit enters the fourth stage and this condition would prevail until the bit was transferred out of the fourth stage and into the fifth stage. Since there is a connection at stage 5 there would be an output to 101 as before.

Following now the coding shown in FIG. 7 and turning to the following groups of five stages, it is apparent that there would be a connection to provide outputs from the stages numbered 6 and 7, no connection at the stages numbered 8 and 9, a connection at stages 10, 11 and 12, no connection at 13, a connection at 14, 15 and 16, no connection at 17, 18 and 19, and finally a connection at 20. The following several stages numbered 21–25 and 27–30 do not have connections to 101 and no outputs would therefore be produced. Stages 26 and 30 have output connections hard wired into the circuit, not through coding plugs.

The term output may be considered as any signal of a distinct voltage level. It may, for example, be ground or about zero volts with no output being some negative voltage level or it may be a negative voltage with no output being zero. Here and in the example to follow relative to FIGS. 8A, 8B–10 the signal is inverted where necessary and in FIG. 6 such inversion is indicated by a small circle in the signal path. An example is OR gate 101. Due to the programming above given, 101 would then produce an output which would have the waveform shown in FIG. 7 as the generated code. Note that this is the inverse of the counter output. The output from 101 is supplied through a lead 103 to an Exclusive-OR 78. The Exclusive-OR has another lead which may be termed the X lead in the manner heretofore described directly from the Schmitt trigger 68 and lead 70. This lead is shown as 76. The Exclusive-OR would then perform its function to provide no output as long as there is a comparison of inputs on the leads 76 and 103 and would provide an output when there is a difference between the inputs on 76 and 103.

Beneath the waveform representing the internally generated code in FIG. 7 there is a representation of comparison points. These comparison points are centered on the time slots for each bit of the code. The circuit 60 includes a structure so as to limit the circuit comparison function to an examination of the X and Y inputs in the center of the time slot. This is accomplished through an AND gate 108 supplied by the output from the Exclusive-OR 78 on lead 79 and by outputs via lead 106 from a one shot multivibrator 104, driven by 90 through leads 102 and 100. The AND 108 is enabled by an input from leads 130 and 128 associated with the successful detect part of the circuit. As the 90 is driven to produce outputs on the leads 96 and 97 the trailing edge of the pulses produced is sampled by the lead 100 to energize the one shot multivibrator 104, which in turn energizes the AND gate with an input on lead 106. The AND circuit 108 is a standard device capable of producing an output only when there is an input on all leads thereto. In the present situation there are three inputs and inputs on all three of them will cause 108 to produce an output. This output is shown connected via lead 110 to a further OR gate 112, which is connected via a lead 114 back to the flip-flop 74. Presence of a signal on lead 114 will drive 74 into the stop condition to stop the oscillator 86, to produce a reset pulse resetting register 98 and to place flip-flop 90 in an initial condition. The use of 108 means that the circuit is effectively made to look at the output from 78 only at the time when the system is in the center of the bit time slot, as indicated by the comparison points represented in FIG. 7. If there is an output from 78 at any other time circuit 60 will not be reset. This eliminates a certain degree of phasing criticality resulting from the lag inherent in the circuit developing the internally generated code relative to the received code.

If we assume now that the internally generated code compares exactly with the transmitted code, the bit being propogated along the register 98 will pass into the stage number 26 to produce an output on the lead connected thereto shown as 122. The lead 122 is connected as input to the AND gate 118 which as mentioned is driven by 90 via lead 100. The presence of an input on lead 100 and on lead 122 will cause 118 to produce an output on a lead 116 to a success flip-flop 124. The success flip-flop is a standard device connected to produce an output in one condition and no output in an opposite condition. When 124 is driven to produce an output the call indicator is energized from the lead shown as 128. The call indicator may be any suitable audible or visual alarm placed in a convenient position to notify the calling station that the system receiver has successfully received a calling code. A reset switch 126 is provided for 124 including a manual button which may be depressed to drive the flip-flop 124 back to the initial condition to prepare it for further operation.

From the foregoing it will be apparent that during the time that the 1 bit in the register 98 traverses the stages 21–25 no outputs will be provided to 101 or to 78. At this time, however, the transmitted waveform should not contain pulses and the presence of pulses forming an additional and improper character would operate to provide an input to 78 with no input from 101. This would cause operation of 112 to reset the system without actuating the success flip-flop 124. In this way the system of the invention may be additionally secured against false operation based upon a similar character code such as 1–2–3–4–5. It is pointed out that the circuit 60 would be compatible with other circuits properly programmed for five character codes; i.e. it would not be disabled to receive its own four character calling code.

The additional stages 21–25 and 27–29 may be utilized for expanding the capability of the system from four groups of five stages to five groups of stages. This would expand the capability of the system to 99,999 possible subscribers. It may be desirable to include these other stages in each unit manufactured or it may be desirable to add additional stages by add-on modules made to interconnect directly into the register. In the latter event only space for these additional positions would be provided. It is contemplated that the additional stages may also be utilized for additional functions. For example, there may be an output provided from the stage number 27 to cut on transmission equipment at the receiver station so as to prepare for the transmission of an acknowledgement signal or to prepare the transmission equipment for the communication between the receiver station and the base station. With certain types of equipment it may be necessary to have distinct outputs from stages 28 and 29 to perform other functions.

One of the important factors is that the additional stages may be provided without in any way affecting operation of the stages actually used for decoding. This makes the system considerably more flexible than a number of existing systems.

At stage number 30 there is shown an output lead 140 connected to an AND gate 134. This AND gate is also supplied by a lead shown as 135 connected to lead 100, which is in turn connected to be driven by flip-flop 90. When an output occurs in stage 30 the presence of inputs on 135 and 140 will cause the AND gate 134 to produce an output representing an order to reset the circuit 60. The output from 134 is carried by a lead 136 to the OR gate 112, the same OR gate which is utilized to cause the system to be reset. Note that all command signals for success and for reset are ANDed with the clock signal in such manner that they are implemented at the midpoint in the clock period. In this manner there is no danger of an uncertain or false command due to advance of the binary counter at the moment the command signal is issued. Note also that both the clock flip-flop 90 and the binary counter 98 are clamped in the reset condition when 60 is at rest, so that there is no chance that 90 or 98 may be in an incorrect state at the start of a signal sequence.

Turning now to FIGS. 8A, 8B and 10, another aspect of the invention system will be described relative to the use of a binary counter. The circuit 150 shown in FIGS. 8A and 8B is organized substantially like the circuit shown schematically in FIG. 6, but with the register being replaced by a five stage binary counter and with the decoding matrix being comprised of arrays of diodes rather than bused connections from the various register stages. FIG. 10 shows the array of diodes utilized in coding plugs which complete related circuit paths from the counter to an OR gate. FIG. 9 shows a time-sequence diagram indicating the binary condition of the five stages of the counter through some 31, counts, which are each associated with a time slot relative to a calling code. The circuit 150 is set up to respond to the calling code of 1–2–3–4, which would have a waveform like that previously discussed relative to FIG. 7. The various logic devices and gates described relative to FIG. 6 again appear in the circuit 150. There is included an input lead 152 from some pulse shaping component such as a Schmitt trigger; a start-stop flip-flop 155; an oscillator 157 and clamp 159; a counter driver 161; a five stage counter 163 including five flip-flops A–E; a decoding matrix 165; an OR gate 167; an Exclusive-OR 169; an AND gate 171; a success flip-flop 173; and a reset driver 175. The circuit is supplied by a supply of −6 v. with ground being represented as 0 v. Reference to FIG. 7 indicates that the presence of a pulse relating to the internally generated calling code is effected by a substantially 0 v. output from the OR gate 167.

The condition of circuit 150 when at rest prior to receipt of a calling code is as follows. The flip-flop 155, comprised of two p-n-p transistors $Q_1$ and $Q_2$, is in condition wherein $Q_1$ is not conducting and $Q_2$ is conducting. Current flowing from the collector of $Q_2$ through the bridging resistors connected to the base of a clamping n-p-n transistor $Q_3$ provides a drop to bias $Q_3$ to conduct. When $Q_3$ conducts its collector is substantially negative, and this prevents the capacitor C–1 in the oscillator 157 from charging and, therefore, holds the unijunction transistor $Q_4$ effectively off, so that the oscillator is not running. When $Q_4$ is off, the oscillator flip-flop 161, including p-n-p transistors $Q_5$ and $Q_6$, is in a condition wherein $Q_5$ is not conducting and $Q_6$ is conducting.

The flip-flops of 163 forming the five stages A–E are in conditions wherein the right-hand p-n-p transistors like $Q_8$, are all conducting; and the left-hand transistors like $Q_7$ are not conducting. This condition is shown in binary terms in FIG. 9 as the rest position, and is achieved by reset lines tied to the base of each of the right-hand transistors of the flip-flops through a series of limiting resistors connected to a reset line 180 tied to a p-n-p transistor $Q_{17}$. At rest time, $Q_{17}$ is held conducting by a negative voltage from a lead connected to the collector of $Q_1$. The OR gate, which is represented by the p-n-p transistor $Q_{24}$ and associated components, is conducting at rest time to provide a 0 v. output connected to each side of p-n-p transistors $Q_{18}$ and $Q_{19}$, which are arranged to perform the Exclusive-OR function heretofore mentioned The transistors $Q_{18}$ and $Q_{19}$ are, at rest-time, in a condition wherein $Q_{19}$ is conducting and $Q_{18}$ is off. These transistors also each have a connection to the base thereof through isolating diodes from the input lead 152. The collector of $Q_{18}$ is connected to a p-n-p transistor $Q_{20}$, which forms part of the AND gate 171 heretofore mentioned. The success flip-flop 173 is comprised of p-n-p transistors $Q_{21}$ and $Q_{22}$, which are, at rest, in a condition wherein $Q_{22}$ is conducting and $Q_{21}$ is not conducting. The collector of $Q_{21}$ is tied to the base of a p-n-p transistor $Q_{23}$ which is utilized to provide a call indication, through a connection to some device such as the lamp L shown. The transistor $Q_{21}$ biases $Q_{23}$ off at rest.

The code plugs for 165 are formed as indicated by numeral 200 in FIG. 10 to include paths connected to both sides of the flip-flops A–E. Each code plug includes a plurality of diodes placed in positions relative to one or the other of the flip-flop outputs, as, for example, A or $\overline{A}$, to generate a waveform corresponding to the assigned number; as, for example, the waveform associated with the 1–2–3–4, as shown in FIG. 7. In addition to the selected connections formed in the code plugs by the placement of diodes, there are other coding paths permanently wired in the circuit 150 to take care of the rest position, and further to develop success and reset signals if the incoming code has beeng successfully compared in each of the groups of time slots. The rest position is accommodated by diodes $D_{20}$ through $D_{28}$ placed in the lines leading from the left-hand transistors of the stages to a lead 160 connected to the OR circuit and to the base of transistor $Q_{24}$. A success signal is developed from the diodes labeled $D_{30}$–$D_{38}$, which are connected to a lead 183 connected to the success flip-flop via the base of $Q_{21}$. The success signal from lead 183 is ANDed with the clock pulse from clock flip-flop 161 via lead 183A to prevent false triggering of 173 by a transition pulse from the five stage binary counter. A reset signal is developed from the diodes labeled $D_{40}$–$D_{48}$ which are connected to a lead 181 and to flip-flop 155. Note that the reset signal is also ANDed with the signal from 161 to prevent false reset.

The decoding or coding plugs, as represented by 200 in FIG. 10, each take care of five time slots for five flip-flops, and as shown are arranged relative to appropriate groups of time slots. It is contemplated that these coding plugs may be made up with matable terminals to be plugged into the hard wired portion of the circuit. Preferably, the diodes may be formed by integrated circuit techniques on chips connected to pluggable terminals connected to each side of each flip-flop; i.e., to both A and $\overline{A}$. A code plug would then, for each flip-flop line, have five diodes with the cathodes thereof separately connected to parallel leads like 202 which connect to the OR gate 167, and with the anodes thereof connected through leads like 204 to both A and $\overline{A}$. The code plug can then be transformed into a specific code plug to develop the desired pattern of connections as in FIG. 10, by severing the lead connections to the appropriate sides, thereby leaving the anodes connected to the proper side. Time slots from which no output is required, as for time slots 4, 8, 9, 13, 17, 18 and 19 as shown in FIG. 9, would have all anode lead connections severed. Thus, with respect to the upper code plug 200 for time slot 1, the terminals associated with A, $\overline{B}$, $\overline{C}$, $\overline{D}$ and $\overline{E}$, would be severed to leave the diodes connected to $\overline{A}$, B, C, D and E. Note that all diodes associated with time slot 4 have been disconnected from the circuit.

Referring again to FIGS. 7, 8A, 8B, 9 and 10 a description of the operation of the circuit 150 will now be given. Assuming that the input on lead 152 is caused to go positive by the input of the tag bit to the Schmitt trigger in accordance with FIG. 7, a voltage transition will be impressed upon lead 154 to the base of $Q_2$, causing $Q_2$ to go off. The cross coupling shown will cause $Q_1$ to conduct and cause $Q_3$, which has its base tied to the collector of $Q_2$, to go off due to the negative voltage then present. When $Q_3$ goes off its collector will rise from a negative voltage to nearly 0 v. to permit the capacitor C–1 to begin to charge through the resistors R–3 and R–5. The RC network formed thereby is adjustable to produce a charging time to cause $Q_4$ to fire approximately 11 milliseconds after $Q_3$ is turned off. The bases of $Q_4$ are tied to resistors R–7 and R–9 connected, respectively, between the 0 v. and —6 v. leads 156 and 158 and chosen to temperature compensate $Q_4$. The oscillator will then produce a positive pulse every 11 milliseconds, so that its period is exactly half the 22 millisecond period of the transmitting signal. Base number 2 of $Q_4$ is tied to the bases of the transistors $Q_5$ and $Q_6$ through isolating and limiting elements as shown. $Q_5$ and $Q_6$ are interconnected as a commutating flip-flop which switches from one stable state to another each time an input is applied. As the base number 2 of $Q_4$ goes positive, it will cause $Q_6$ to go off and, as a result, $Q_5$ to come on. When $Q_4$ again goes positive, it will cause $Q_6$ to come on and $Q_5$ to go off. The collector of $Q_6$ is connected to the bases of the transistors $Q_7$ and $Q_8$ in the flip-flop, stage A, of the counter. This will then cause a reversal in flip-flop A, to cause $Q_7$ to conduct and $Q_8$ to go off. The counter will then be in the condition shown in time slot 1 in FIG. 9. Further operation of flip-flop 161 will then cause the counter stages to develop a sequence of on and off conditions to provide the patterns in time slots 2–31 shown in FIG. 9.

Referring back to the rest position, it will be apparent that diodes D–20—D–28 are all connected to the non-conducting halves of the flip-flop A–E; and, since the leads therefrom are all at a substantial negative voltage drawn from lead 158, the lead 160 will see a negative potential through the diode D–5. Because of this, current may flow through the diode D–6, and from the base of $Q_{24}$ since it is at a more positive potential. This will bias $Q_{24}$ on to provide about 0 v. on the lead 162. This serves as a signal input to 169. If any one of the diodes D–20—D–28 had been otherwise connected so as to provide a 0 v. connection from any one of the flip-flop outputs $\overline{A}$–$\overline{E}$, the line 160 would have been raised to 0 v. and no current would flow therein, removing the drive from $Q_{24}$ and causing it to go off. This would place its output lead at a substantial negative voltage as a signal input to 169. Thus, we see the control mode of $Q_{24}$ as being either substantially 0 v., or a substantial negative voltage.

At rest position, the input on lead 162 coupled to $Q_{18}$ and $Q_{19}$, would also provide a substantially 0 v. input through the two leads shown as 164 and 166. At rest position there is also a substantial negative voltage from the Schmitt trigger via lead 152. Since the two inputs to the Exclusive-OR 169 are relatively opposite in polarity, 169 will have a negative output which, via leads 168 and 176, will clamp start-stop flip-flop 155 in a stop or reset condition. This clamp is removed when 169 receives a positive signal from the Schmitt trigger indicating the start of a received code sequence. A further lead 178 is connected to the collector of $Q_{21}$ to clamp $Q_{20}$ to prevent reset after a successful decode. This is to allow the counter 163 to count through time slots 27–30 which may be used for some command option. Prior to an output from 183 $Q_{22}$ conducts and $Q_{21}$ is off. Since $Q_{21}$ is off, lead 170 will be at a negative voltage biasing $Q_{23}$ off. When $Q_{21}$ is caused to conduct by a negative potential to the base from 183, it will conduct to cause $Q_{23}$ to conduct and signal success.

As the transistors of the stages A–E alternate in conducting, voltage changes will be coupled through leads A–E and $\overline{A}$–$\overline{E}$ and the associated diodes shown in FIG. 10. As a result of the connection through a lead 172, the AND gate 171 will look at the output from the Exclusive-OR and $Q_{24}$, only while $Q_5$ makes a positive transition to establish the comparison points heretofore described.

In accordance with FIG. 9, if the incoming code has the waveform, shown to the left for the code 1–2–3–4 and the unit is programmed as indicated by the coding block in FIG. 10, there will be a substantially 0 v. output from $Q_{24}$ until the fourth time slot, at which time it will be observed that the diodes associated with time slot 4 have been removed so that there is no negative input to $Q_{24}$. Thus $Q_{24}$ will go off. This will present a substantially negative voltage on 162. At that time the code waveform, supplied by lead 152, will also be of a negative voltage and $Q_{18}$ will continue to clamp 168. A comparison of FIGS. 9 and 10 will show that the code plug arrangement is arranged relative to each time slot to provide a comparison through the four groups of time slots representing the four calling characters. In the fifth group of time slots, periods 21–25, it will be observed there is no incoming code waveform. There is, however, no input negative connection to $Q_{24}$ at any time during these time slots, and therefore the Exclusive-OR will continue to produce no output. If a pulse occurred in the fifth group of time slots, 21–25, as it might for some other receiver station in the system for a receiver having a code 1–2–3–4–5, a change from negative to substantially 0 v. would result on lead 152. There would, however, be no change in the output from $Q_{24}$ on lead 162, and the Exclusive-OR would operate; $Q_{19}$ being caused to turn off so that $Q_{20}$ controls the voltage on lead 168. Responsive to $Q_5$ via the lead 172, $Q_{20}$ would turn off momentarily, to drop the voltage at the base of $Q_2$ causing $Q_2$ to conduct which, in turn, causes $Q_1$ to go off. This would operate to reset the circuit by causing $Q_3$ to come on, clamping the oscillator through the connection to the emitter of $Q_4$. It would also cause $Q_{17}$ to conduct, resetting the various stages A–E of 163 and the oscillator flip-flop 161.

If we assume now that the waveform continues with the stages continuing to operate in the code format shown in FIG. 9, at the time slot 26, the hard wired connections through diodes $D_{30}$–$D_{38}$, will produce a −6 v. output on lead 183, which is in turn ANDed with the negative portion of the oscillator flip-flop signal via lead 183A to cause $Q_{21}$ to come on and $Q_{22}$ to turn off. $Q_{21}$ in turn places a positive potential on the base of $Q_{23}$, biasing it to come on and provide an indication of call by lighting lamp L.1. The oscillator continues to drive the 5 stage counter to time slot 30 at which time a negative signal on lead 181 is ANDed with the clock signal on lead 183A to reset 155 and sequentially the other flip-flops as described. A successful calling code will have then been properly compared and the circuit of 150 operated to provide an indication of receipt of a calling code. A reset button 191 in the circuit 150 operates to close the base of $Q_{22}$ to −6 v., causing it to conduct and, through the cross-coupling shown, cause $Q_{21}$ to go off to bias $Q_{23}$ off and extinguishing the lamp L. At this time, the circuit 150 having been reset is ready to receive another call.

From the description given, it should be apparent how the circuit 150, through only five stages, is capable of handling four characters which, in terms of subscribers in a system, would be one short of ten thousand. It should be apparent that the circuit of 150 may be utilized in a system wherein there is a fifth digit used, such as 1–2–3–4–5 with the fifth digit being employed for options or other circuit functions, or to expand the system to accommodate additional subscribers. The fifth digit capability could be added into the circuit 150 by the addition of a coding plug to handle the time slots 21–25 for additional subscribers or time slots 26–30 for options or other circuit functions. Since five stages will, in fact, accommodate a code having thirty-one time slots the system could be readily used with two additional digits for generating additional functions or for expanding the system. If an additional code plug were added to accommodate a five-digit code, the system would accommodate one short of one-hundred thousand subscribers, and if an additional stage were added to expand the number of time slots available to 64, code plugs could be provided to expand the system to one short of one million, utilizing only thirty time slots and, if all sixty-four time slots were used, the number of subscribers to be accommodated would exceed ten times ten to the tenth subscribers. In special systems, these additional digits could, of course, be used for forming additional functions.

Having now described my invention in terms intended to enable its preferred mode of practice in a number of embodiments, I define it by the appended claims.

I claim:

1. In a selective signalling system for calling one or a plurality of receiver stations, the combination comprising a calling station and means therein to generate a series of bits at a given clock rate to form a calling code, means at such receiver station to receive said calling code, means at such receiver station responsive to the first bit of the calling code to generate a receiver code at said given clock rate, means at said receiver station to translate said receiver generated code into a code format like that of the calling code and means to sequentially compare on a bit-by-bit basis the received calling code and the locally generated code, said last-named means including means for providing an output immediately upon recognizing a lack of comparison between any pair of compared code bits of said codes, with further means responsive to said output to reset the said receiver station means to an initial condition preparatory to receiving further codes and to stop and reset said means to compare, a second receiver station and means at a second receiver station responsive to a comparison of bits in said codes to produce an indication of the successful receipt of a proper calling code at said receiver station.

2. The system of claim 1 further including a second receiver station and means at said second receiver station responsive to a comparison of bits in said codes to produce an indication thereof.

3. The system of claim 2 including means responsive to a comparison of said codes to reset the said receiver station.

4. The system of claim 3 wherein said named means includes a detector for developing a control signal in response to the occurrence of a receiver code occurring after that necessary to generate the code for comparison.

5. The system of claim 1 wherein said means to generate a receiver code is comprised of a series of bistable state devices connected in series and driven by a driver having said given clock rate, said stages having parallel outputs with said means for translating being connected thereto to produce the locally generated calling code as said stages are driven to different stable states by said driver.

6. The system of claim 1 wherein said means to generate the receiver code is comprised of a series of bistable state stages and there is provided a driver operable to produce drive pulses at said given clock rate, said stages being connected in a circuit to produce a progressive binary count output in parallel, and said means to translate is operable in response to said binary count to produce the locally generated calling code.

7. The system of claim 1 wherein there is provided means responsive to the first part of the calling code received at a receiver station to produce a series of drive pulses continuously until cut-off by a separate control signal, said drive pulses being at said given clock rate, and there is provided a separate means for detecting a given series of bits in the last part of the receiver code to produce such separate control signal.

8. The system of claim 1 wherein said means for generating a receiver code is comprised of a series of bistable state stages connected in a circuit to be driven sequentially to produce a pattern of bits in a sequential order related to the number of stages, the number of patterns of bits being greater than the number of patterns of bits necessary to generate said calling code and means are provided responsive to certain of said patterns of bits other than those utilized to generate said calling code to generate auxiliary control signals at said receiver station.

9. The system of claim 1 wherein each said receiver station includes a series of plug members housing distinct conductive path patterns and means to connect said members with the means at the receiver station to translate said generated code whereby to provide different translated codes at each receiver station to cause different receiver stations to respond to different calling codes.

10. The system of claim 9 whereby each plug member includes a diode mounting arranged to form selective conductive paths from each of said stages to effect said different translated codes.

11. In a selective signalling system, a calling station having means therein to generate a calling code comprised of a series of bits at a given clock rate, means to transmit said calling code and means at a given receiver station to receive said calling code, means at said receiver station responsive to the receipt of said calling code to locally generate the given calling code, an Exclusive-OR logic device at said receiver station connected to receive the calling code and the locally generated code and to compare on a bit-by-bit basis the received calling code and the locally generated code to produce no output when there is a comparison between the bits of the said code and to produce an output when there is a lack of comparison between said codes, means at said receiver station responsive to said Exclusive-OR output to reset said receiver station means to an initial condition preparatory to receiving further calling codes, and means at said receiver station responsive to said locally generated code in the event that there is no output from said Exclusive-OR to produce an indication of receipt of a proper calling code wherein said means for generating said code includes means to produce patterns of binary bits in an ordered sequence with the number of patterns being greater than the number of time slots for the calling code, and there is provided means responsive to at least one of said patterns occurring at a time after sufficient patterns have been generated to form the given calling code to provide a control signal for said receiver station.

12. The system of claim 11 wherein said means for generating said code includes a binary counter.

13. The system of claim 11 wherein said means for generating said code includes as a shift register operable to produce an ordered sequence of outputs one at a time to develop said patterns.

14. In a selective signalling system having an address transmitter capable of transmitting an address code of variable bit length wherein said address code includes an initial tag bit for commencing operation at plural receiver stations, the system having said plural receiver stations, each said station including means responsive to said tag bit for initiating generation of a sequential address bit code at each receiver station, each receiver station generating an address code unique thereto, means at said receiver station for comparing said address code generated at said receiver with said code transmitted from said transmitter sequentially on a bit-by-bit basis, means responsive to any non comparison between a transmitted bit and a locally generated bit to immediately inhibit operation of said address code generator at said receiver and reset same and means at said receiver station responsive to a comparison of all bits generated at said receiver to provide an indication thereof.

15. In a system as set forth in claim 14, means responsive to generation of said indication for resetting said code generator at said receiver.

References Cited

UNITED STATES PATENTS

| | | | |
|---|---|---|---|
| 3,226,679 | 12/1965 | Malone | 340—164 |
| 3,335,406 | 8/1967 | Clark | 340—164 |
| 3,336,577 | 8/1967 | Frielinghauss | 340—163 |
| 3,382,485 | 5/1968 | Pettitt | 340—163 |
| 3,387,270 | 6/1968 | Adlhoch et al. | 340—164 |

DONALD J. YUSKO, Primary Examiner

U.S. Cl. X.R.

340—163